United States Patent [19]

Hadaway

[11] 4,174,845
[45] Nov. 20, 1979

[54] FLUID SEAL

[75] Inventor: Bernard M. Hadaway, Highett, Australia

[73] Assignee: Repco Research Proprietary Limited, Victoria, Australia

[21] Appl. No.: 811,857

[22] Filed: Jun. 30, 1977

Related U.S. Application Data

[63] Continuation of Ser. No. 601,651, Aug. 4, 1975, abandoned, which is a continuation-in-part of Ser. No. 349,174, Apr. 9, 1973, Pat. No. 3,923,315.

[30] Foreign Application Priority Data

Aug. 15, 1974 [AU] Australia .................... PB8545/74

[51] Int. Cl.² .............................................. F16J 15/32
[52] U.S. Cl. ................................................... 277/134
[58] Field of Search .......................................... 277/134

[56] References Cited

U.S. PATENT DOCUMENTS

| 3,501,155 | 3/1970 | Dega et al. | 277/134 |
| 3,672,690 | 6/1972 | Berens | 277/134 |
| 3,801,113 | 4/1974 | Jackson | 277/134 |

FOREIGN PATENT DOCUMENTS

| 1153578 | 8/1963 | Fed. Rep. of Germany | 277/134 |
| 1239873 | 7/1971 | United Kingdom | 277/134 |

Primary Examiner—Robert I. Smith
Attorney, Agent, or Firm—Stevens, Davis, Miller & Mosher

[57] ABSTRACT

A fluid seal for use between two relatively rotatable members and including a body section to be secured to one member or its support, and a circular lip projecting from the body for sealing engagement about or around a surface of the other member. The lip is defined by two angularly arranged surfaces which meet at a common edge to form a sealing edge of the lip, and a pumping configuration is provided on one of those surfaces. A feature of the invention is the provision of discontinuities around the lip edge so that relatively small discrete passages provide a communication between the two sides of the lip whereby fluid can be returned through the seal under the influence of the pumping configuration. The discontinuities can be formed by projections on the lip edge which are depressed to create the communication passages through distortion of the lip, or they may be recesses or gaps preformed in the lip edge.

11 Claims, 12 Drawing Figures

FLUID SEAL

This is a Continuation of application Ser. No. 601,651 filed Aug. 4, 1975 and now abandoned, which in turn is a continuation-in-part of application Ser. No. 349,174 filed Apr. 9, 1973 (which is now U.S. Pat. No. 3,923,315 which issued Dec. 2, 1975).

This invention relates to fluid seals for use between two relatively movable members, and especially such seals as used to guard against fluid leakage between a rotatable shaft or spindle and a surrounding surface of a stationary component or assembly. It will be convenient to hereinafter describe the invention with particular reference to such seals as used in the transmission system of motor vehicles to seal against leakage of lubricant and which are commonly referred to as annular lip seals.

Lip seals generally comprise an annular body of rubber or some other suitable flexible material, adapted to surround a shaft and having a lip formed thereon so as to make sealing engagement with the shaft. Usually, the lip edge which actually makes sealing engagement is defined by the common edge of two adjacent and angularly disposed surfaces of the seal body. Quite often the seal body is supported by a metal ring, and a circular spring cooperates with the seal body to urge the lip against the associated shaft.

In practice it is found that seals of the aforementioned type allow some escape of lubricant, and a considerable amount of research has gone into attempts to find a solution to that problem. One partially successful development is the so-called "hydrodynamic" seal which relies on a configuration applied to either the seal body or to the shaft to pump escaping lubricant back towards the fluid side of the seal. For example, in one such seal a series of ribs are formed on one of the surfaces defining the seal lip, and those ribs are arranged with their axes extending angularly relative to the shaft axis. During rotation of the shaft, oil tending to escape past the seal lip engages the ribs and is thereby deflected back towards the fluid side of the seal. That is, the return "pumping" action of the seal arises out of the combined affect of the disposition of the ribs and the movement of the oil in the direction of rotation of the shaft.

Although the hydrodynamic seals are generally an improvement on the basic form of lip seal, they are not entirely satisfactory. Usually, the return pumping action imparted by the ribs is insufficient to force a significant amount of the fluid back past the sealing edge to the fluid side of the seal.

It is a principal object of the present invention to provide an improved hydrodynamic fluid seal which is effective in returning fluid under dynamic operating conditions, and which also provides an effective fluid barrier under static conditions. Although the invention will be hereinafter described in relation to an inner seal—i.e., one which surrounds the member against which it seals—it is applicable to an outer seal which is surrounded by the member against which it seals.

In accordance with the present invention, there is provided a fluid seal for use between two relatively rotatable members, including:

an annular body attachable to one of said members;

a circumferential and flexible lip formed on said body and projecting therefrom so that a sealing edge of said lip is engagable with the other said member;

said lip edge being defined by the common edge of two angularly disposed annular surfaces;

a pumping configuration formed on one of said surfaces and being operative to urge fluid towards said lip edge during relative rotation of said members;

and a plurality of discontinuities provided around the circumference of said lip edge so that, in use, there is interrupted engagement between said lip edge and said other member, and each interruption is such that it defines a passage whereby fluid can be transferred from one side of said lip to the other.

The discontinuities may be defined by raised sections on the lip, which need not be large and which will be depressed into the lip body when the seal is in use. As a result of that depression, small gaps are formed across the lip edge on each side of the depressed section, and each gap defines a passage through which fluid may pass from one side of the lip to the other. For optimum results, the passages should be positioned to receive any concentrated flow of fluid emanating from the pumping configuration. Furthermore, each raised section may form part of that configuration or an extension thereof.

In an alternative arrangement, each discontinuity may be a recess or gap preformed in the lip edge, for example during moulding of the seal or subsequently by cutting, grinding, or any other suitable process.

The fluid passages should not be so large in cross-section as to permit through flow of fluid under static conditions, but the maximum permissible size may vary according to the conditions of use, and in particular the viscosity of the fluid to be sealed.

The following description refers in more detail to these essential features and further optional features of the invention. To facilitate an understanding of the invention, reference is made to the accompanying drawings where these features are illustrated in preferred form. It is to be understood however, that the essential and optional features of the invention are not limited to the specific forms of these features as shown in the drawings.

Figure 1:
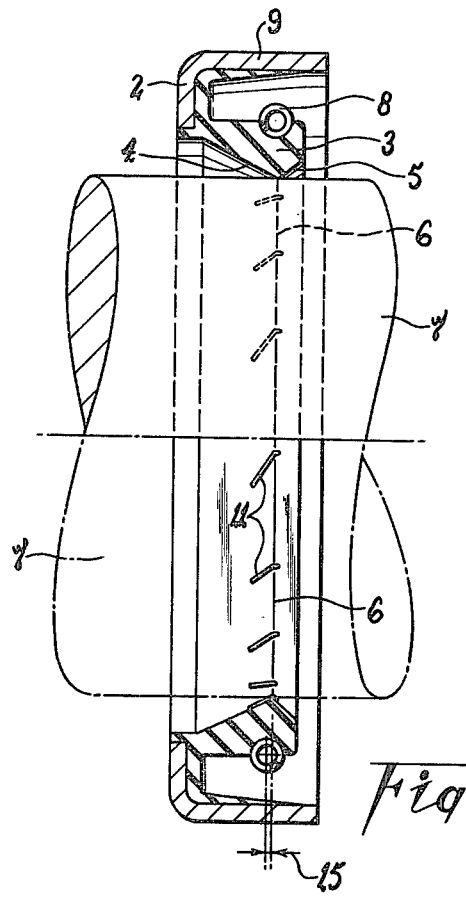
FIG. 1 is a cross-sectional view of an example uni-directional seal incorporating one embodiment of the invention.
Figure 2:
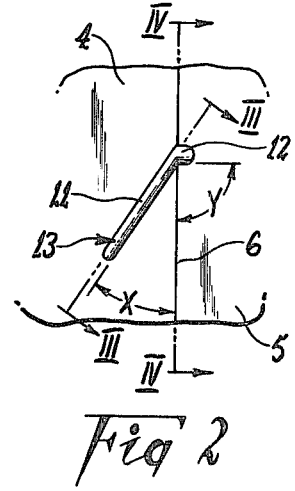
FIG. 2 is an enlarged fragmentary view showing part of the pumping configuration of the seal of FIG. 1.
Figure 3:
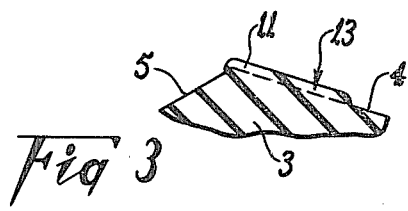
FIG. 3 is a sectional view taken along line III—III of FIG. 2.
Figure 4:
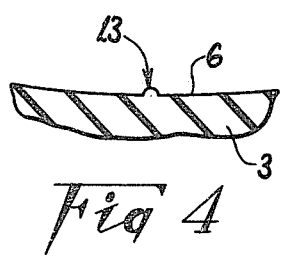
FIG. 4 is a sectional view taken along line IV—IV of FIG. 2.

As previously stated, a seal according to the invention is distinguished over prior construction in that, in use, the sealing edge of the lip is discontinuous so that a plurality of passages are defined between the opposite sides of the seal. In the example embodiments shown in FIGS. 1 to 8 of the drawings, those passages are formed by projections extending across the seal lip and which are pushed radially into the seal body when the seal is in an operative position, and because of that deformation a groove or channel is defined on each side of the projection. Thus the seal lip engages the surface of the associated member over the length extending between the grooves or channels of adjacent projections. It is further preferred that each of the aforementioned projections forms a continuation of a pumping rib, and each pumping rib or only selected pumping ribs, may be so extended, as desired.

The invention is applicable to various seal constructions, but it will be convenient to hereinafter describe the invention as applied to the typical annular lip seal as shown in the drawings. Such a seal includes a main body 2 and a lip 3 defined by a pair of angularly disposed annular surfaces 4 and 5 which extend from the body 2 and meet at a common edge to form the sealing edge 6 of the lip 3. The lip edge 6 is circular, and at least the lip 3 is formed of a flexible material such as rubber, although it is generally preferred to form the body 2 of the same material. In use, the lip surface 5 is exposed to the oil (or other fluid) which is to be held against leakage, and the surface 4 is usually exposed to atmosphere or another fluid chamber, and the lip edge 6 contacts the shaft or spindle 7 with which the seal is used. Other constructional features of such seals, such as the biasing spring 8 and metal housing 9, are well known and will not be hereinafter particularly described.

Any one of the known pumping configurations may be applied to the surface 4 at the atmosphere side of the lip 3. For example, that configuration may comprise a series of "V" shaped recesses cut or formed into the surface with their apexes located remote from the lip edge. Alternatively, it may comprise one or more continuous wavy or sinuous barriers extending around the lip surface and formed by a rib or recess in the surface. Yet another known configuration comprises a series of parallel ribs formed on the lip surface and extending at an angle relative to the axis of the shaft with which the seal is used. Still a further construction includes a helical groove formed in the lip surface.

In all of the foregoing constructions, the configuration is arranged so that oil moved in the direction of rotation of the shaft will be deflected back towards the lip edge when engaged by a surface of the configuration which is angularly disposed relative to the axis of the shaft. Some of those configurations are uni-directional in the sense that they will pump for one direction of rotation of the shaft only, whereas the others are bi-directional and will pump for both directions of rotation of the shaft.

The particular embodiment of the invention shown in FIGS. 1 to 6 of the drawings, will now be described, and those figures show a uni-directional seal in which the pumping configuration is defined by a series of raised rib sections 11 extending across the lip surface 4, and each having an extension 12 which terminates on the fluid side of the seal. It is to be understood however, that such an extension 12 may not be provided on all of the rib sections 11. Each section 11 and its extension 12 cooperate to form a rib 13 which traverses the lip edge 6 and thereby forms a projection which stands out from that edge in the undeformed state of the seal—i.e., not in use. In that regard see FIGS. 3 and 4 of the drawings.

In the preferred arrangement shown, each rib section 11 is arranged at an angle "X" within the range 24° to 30° inclusive, relative to the plane of the lip edge 6, and an angle of 27° has been found particularly satisfactory. It is also preferred that the extension 12 of each rib section 11 extends angularly relative to its respective section 11, and each extension 12 is at an angle "Y" to the aforementioned plane, which may be substantially 90° but that is not essential.

The length of each rib extension 12 may be short relative to that of the rib section 11 on the atmosphere side of the seal. Furthermore, it is preferred that adjacent rib sections 11 are spaced a substantial distance apart so they do not overlap when viewed in the axial direction of the seal (see FIG. 1), and that they are substantially evenly spaced around the circumference of the seal.

Figure 5:
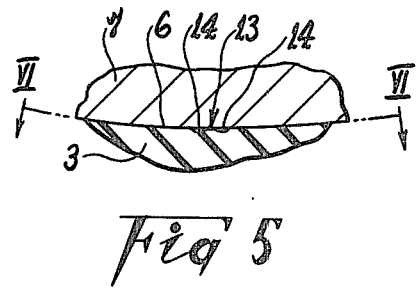
FIG. 5 is a view similar to FIG. 4 but showing the condition of the seal when located in sealing engagement about a shaft.
Figure 6:
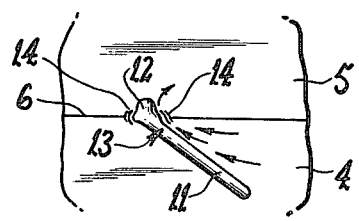
FIG. 6 is a view taken along line VI—VI of FIG. 5.

A seal as described above is made to suit a shaft 7 of a particular diameter—i.e., in accordance with conventional practice the diameter of the lip edge 6 is predetermined to provide an interference fit with the shaft 7. The ribs 13 however, intrude into the zone intended to be occupied by the shaft 7, when the seal is in its free or undeformed state (see FIG. 4). Thus, when the seal is fitted to the shaft 7, the part of each rib 13 projecting beyond the lip edge 6, is resiliently deformed and forced back into the body of the lip as shown in FIGS. 5 and 6. There will of course be consequent resilient deformation of the edge 6, and that produces recesses or interruptions 14 in the edge 6 on both sides of the rib 13 whereby a communication passage is provided between the fluid and atmosphere sides of the lip. FIG. 5 shows the recesses 14 as being larger than what is likely to occur in practice, and that was done for convenience of illustration.

With the deformation as described, the portions of the lip edge 6 extending between each recess 14 is able to engage the shaft 7 in the usual manner to achieve a fluid tight seal about that shaft. Also, the deformation as described is dependent to some degree on the cross sectional size of each rib (especially its depth), the force exerted on the elastomer seal body 2 by the spring 8, and the axial spacing 15 between the centre line of the spring 8 and the centre line of edge 6. The hardness of the elastomer used in making the seal is also a relevant factor.

It will be understood from the foregoing that when a seal as described is mounted on a shaft 7 under dynamic conditions, the force exerted on the fluid relative to the direction of rotation of the shaft 7 produces a high pumping action due to the free passage of fluid along the helical rib sections 11 and through the sealing edge 6 by way of the passages or recesses 14. Other known hydrodynamic sealing configurations which employ an unbroken contact sealing edge either fail to produce a pumping action or produce one which is greatly diminished compared to the action described above.

The seal of the present invention is effective under both dynamic and static conditions. Although the sealing edge 6 is still broken by the influence of the ribs 13 under static conditions, the passages 14 are small enough to use the capillary action of the fluid under seal to produce a static seal. Consequently, the cross-sectional size of the passages 14 may be varied according to the conditions of use of the seal, and particularly the viscosity of the fluid to be sealed. Such variation can be effected by modifying one or more of the deformation influencing parameters discussed above.

Figure 7:
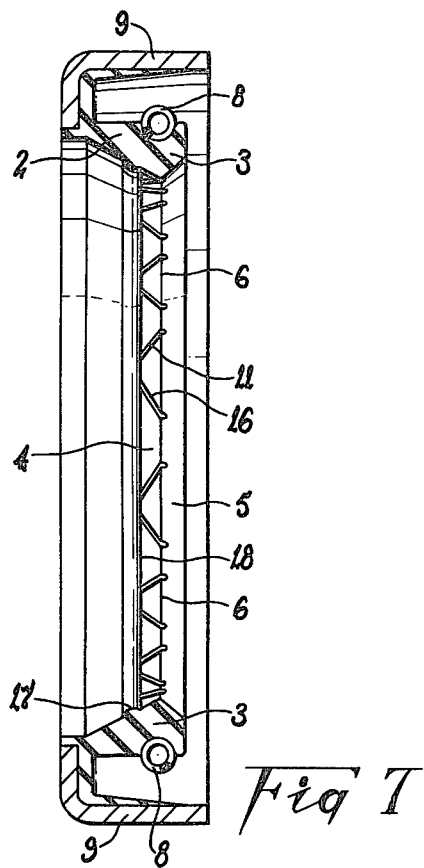
FIG. 7 is a view similar to FIG. 1 but showing a bi-directional seal.

A construction as described may be adapted for bi-directional operation by providing a second series of rib sections 16 in the manner shown in FIG. 7. In that bi-directional construction, adjacent rib sections 11 and 16 slope in substantially opposite directions, and alternate rib sections extend away from the lip edge 6 in substantially the same direction.

Figure 8:
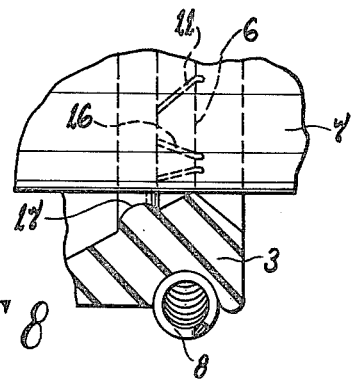
FIG. 8 is an enlarged view of part only of the construction shown in FIG. 7 and showing the seal in engagement with a shaft.

The construction shown in FIGS. 7 and 8 is basically the same as that forming the subject of U.S. patent application Ser. No. 349,174 filed 9 Apr. 1973, except that discontinuities have been added to the lip edge 6 in the manner previously described. A barrier wall 17 is included in that construction and functions as described in application Ser. No. 349,174. The wall 17 projects from the seal body 2 in substantially the same direction as the lip 3 and is contiguous with surface 4 of the lip so that a fluid catchment groove 18 is defined between the wall 17 and the surface 4. In that construction, it is preferred that each of the rib sections 11 and 16 passes across the full width of the surface 4 so as to extend up to the wall 17.

Figure 9:
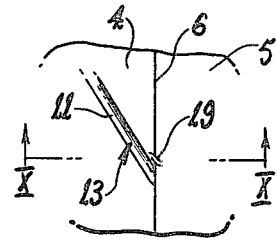
FIG. 9 is a view similar to FIG. 2 but showing an alternative embodiment of the invention.
Figure 10:
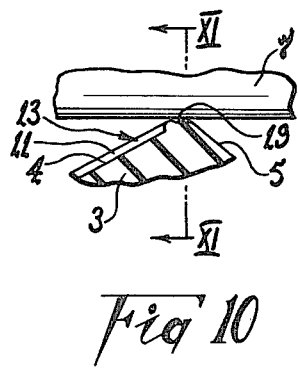
FIG. 10 is a cross-sectional view taken along line X—X of FIG. 9.
Figure 11:
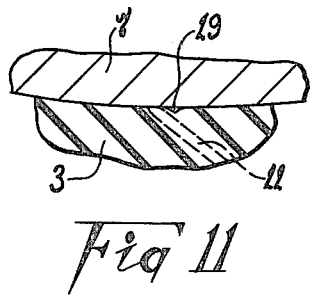
FIG. 11 is a cross-sectional view taken along line XI—XI of FIG. 10.

FIGS. 9 to 11 show an alternative form of the invention when applied to a uni-directional seal. In that form, the ribs 13 do not extend across the lip edge 6, but that edge is interrupted by a plurality of recesses 19 which may be formed during moulding of the seal, or they may be formed by cutting, grinding, or any other appropriate operation carried out either during or subsequent to the basic forming operation of the seal. It is preferred, but not essential, that a recess 19 is located adjacent each rib 13, and that the relationship is substantially as shown in FIG. 9.

Figure 12:
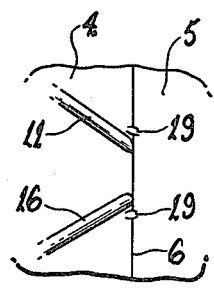
FIG. 12 is a view similar to FIG. 9 but showing that embodiment of the invention applied to a bi-directional seal.

FIG. 12 shows how the last described embodiment of the invention may be applied to a bi-directional seal.

It will be understood that various alterations, modifications and/or additions may be incorporated into the foregoing without departing from the ambit of the invention as defined by the appended claims.

Having now described our invention, what we claim as new and desire to secure by Letters Patents is:

1. A fluid seal for use between two relatively rotatable members including:
   an annular body attachable to one of said members;
   a circumferential resilient, flexible lip formed on said body and projecting therefrom so that a sealing edge of said lip is engageable with the other said member;
   said sealing edge being defined by the common edge of two angularly disposed annular surfaces;
   a pumping configuration formed on one of said surfaces and being operative to urge fluid towards said sealing edge during relative rotation of said members; and
   a plurality of discontinuities in the form of ribs on said same surface as said pumping configuration, projecting out from said surface, and extending over said sealing edge to said other angularly disposed annular surface,
   said ribs being at regularly spaced intervals around the circumference of said lip edge; and
   said ribs and said lip being resiliently deformable whereby as said sealing edge engages said other member, capillary recesses form on either side of said rib to permit fluid to be transferred from one side of said lip to the other under dynamic conditions, but not under static conditions.

2. A fluid seal according to claim 1, wherein said lip is maintained in engagement with said other member by an annular bias spring.

3. A fluid seal according to claim 1, wherein said pumping configuration comprises a plurality of raised rib sections formed on said one surface so that each extends angularly relative to said sealing edge, said rib sections being spaced apart around the circumference of said one surface, and each said discontinuity comprises an extension of a respective one of said rib sections which traverses said sealing edge and terminates on the other said lip defining surface.

4. A fluid seal according to claim 3, wherein each said rib extension is arranged angularly relative to its respective said rib section.

5. A fluid seal according to claim 4, wherein each said rib section and its respective said extension meet substantially at said sealing edge, and each said extension is arranged to extend across said other surface at substantially 90° to said sealing edge.

6. A fluid seal according to claim 3, wherein said rib sections are substantially regularly spaced around said lip, and adjacent said rib sections extend generally in the same direction away from said sealing edge.

7. A fluid seal according to claim 3, wherein each two adjacent said rib sections extend angularly relative to each other, and each two alternate rib sections extend generally in the same direction away from said sealing edge.

8. A fluid seal according to claim 1, wherein a circumferential barrier wall is provided coaxially with said sealing edge and in axially spaced relationship thereto, and said barrier wall is located adjacent said one surface of the lip and projects generally radially from said body in substantially the same direction as said lip so that a circumferential fluid catchment groove is defined between said wall and said one surface.

9. A fluid seal according to claim 8, wherein each said rib section extends completely across said one surface, and said barrier wall is contiguous with said one surface so that each said rib section extends up to that wall.

10. A fluid seal for use betwen two relatively rotatable members, including:
    an annular body attachable to one of said members;
    a circumferential resilient, flexible lip formed on said body and projecting therefrom so that a sealing edge of said lip is engageable with the other said member;
    said sealing edge being defined by the common edge of two angularly disposed annular surfaces; and
    a pumping configuration in the form of ribs formed on one of said surfaces, projecting out from said surface, and extending over said sealing edge to said other angularly disposed annular surface;
    said ribs being at regularly spaced intervals around the circumference of said sealing edge and a portion of said rib on one of said surfaces forming an angle with said sealing edge of from about 24° to 30°; and
    said ribs and said annular body being resiliently deformable whereby as said sealing edge engages said other member, capillary recesses form on either side of said rib to permit fluid to be transferred from one side of said lip to the other under dynamic conditions during relative rotation of said members, but no under static conditions.

11. A fluid seal according to claim 10, wherein said ribs form an angle with said sealing edge of about 27°.

* * * * *